(No Model.)
M. McE. KILLINGER.
ROPE COUPLING.
No. 432,626. Patented July 22, 1890.
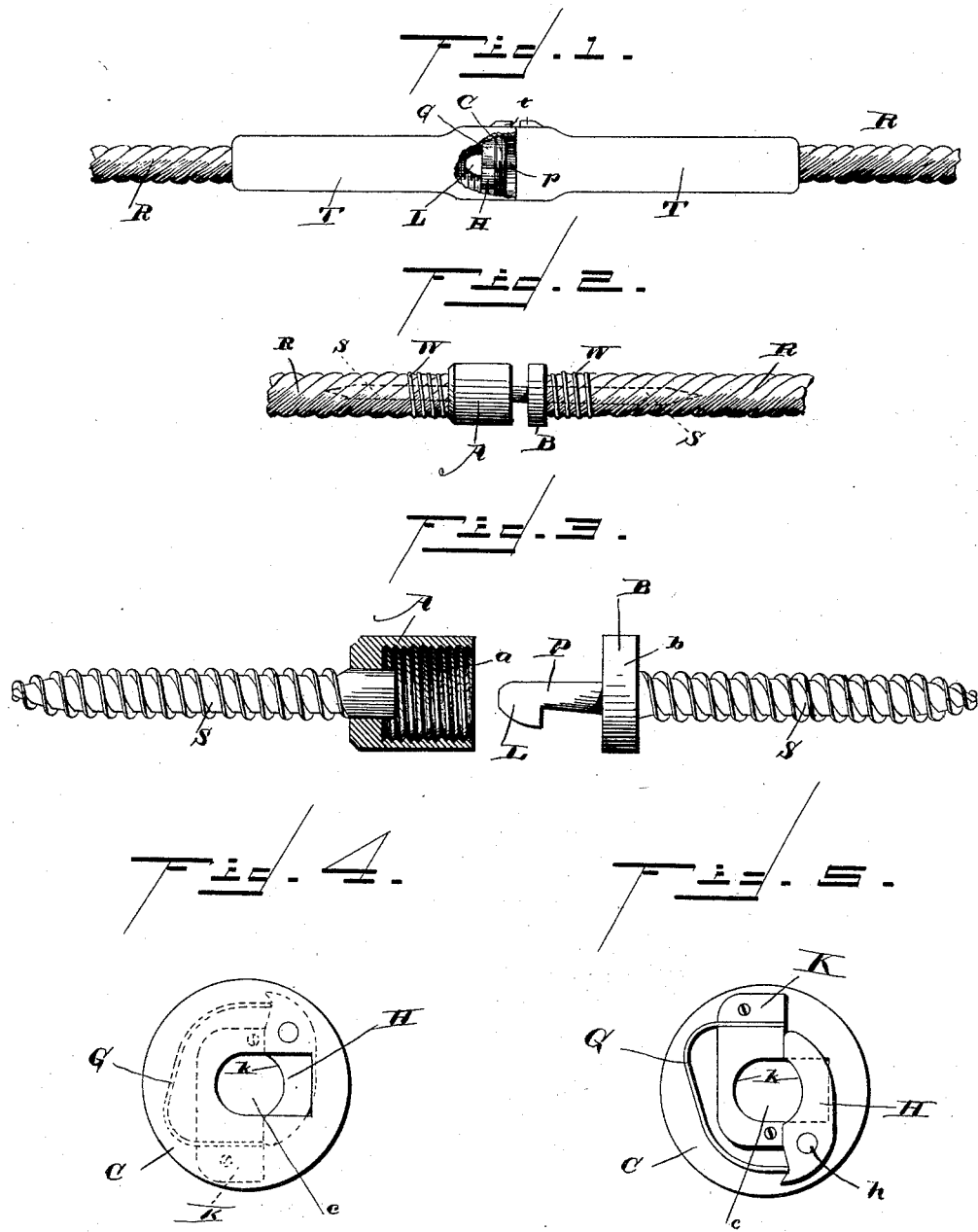

UNITED STATES PATENT OFFICE.

MELROSS McENTYRE KILLINGER, OF BATTLE CREEK, NEBRASKA, ASSIGNOR OF ONE-HALF TO R. D. SCOTT AND A. G. MAYERS, OF SAME PLACE.

ROPE-COUPLING.

SPECIFICATION forming part of Letters Patent No. 432,626, dated July 22, 1890.

Application filed January 24, 1890. Serial No. 337,962. (No model.)

*To all whom it may concern:*

Be it known that I, MELROSS McENTYRE KILLINGER, a citizen of the United States, residing at Battle Creek, in the county of Madison and State of Nebraska, have invented a new and useful Rope-Coupling, of which the following is a specification.

This invention relates to couplings more especially of that class adapted for use in connection with railroad-trains, whereby the ends of the sections of bell-rope extending through the different cars may be joined; and the invention consists, broadly speaking, of screw-shanks adapted to be passed into the ends of the rope and carrying heads, one of which has a forwardly-projecting point with a lateral lug and the other of which has a slotted plate and a pivoted catch moving over the slot in the plate and adapted to engage under the lug on said projection. Rubber tubing is also provided, which is slipped over the threaded shanks of the coupling devices and also of the heads for the combined purpose of holding the parts in place and of preventing breakage of the car-windows or injury of passengers.

In carrying out this general idea the invention also consists of certain details of construction and arrangement of parts, as hereinafter more fully described.

In the accompanying drawings, Figure 1 is a side elevation of the parts of my improved coupling, showing the head partly broken away to illustrate the position of parts when connected. Fig. 2 is a similar view with the rubber tubing removed. Fig. 3 is an enlarged longitudinal section of the two parts of the coupling with the slotted plate of one removed. Fig. 4 is an enlarged outer plan view of said slotted plate, showing the pivoted catch in dotted lines. Fig. 5 is a similar inner view of the same.

The letter R designates the bell-rope, which may be of the ordinary size, although my device is adapted to be used upon larger or smaller ropes, as may be desired.

The letters A and B designate, respectively, what I will call the "U-head" and the "T-head" members of my improved coupling device. Each member is provided with a rearwardly-extending screw-threaded shank S, which is passed into the end of the rope, as shown in dotted lines in Fig. 2, and the strands of the rope are closely gathered around this shank, the ends thereof abutting against the inner faces of the heads of the members. A wire W is then tightly wrapped around the ends of the strands slightly in rear of said heads, whereby the strands are prevented from becoming uncoiled or frayed out. A piece of rubber tubing T is then passed over the end of the rope from a point in rear of the inner end of the shank S to a point a little in advance of the outer face of the head of each member, so that when the two members are coupled together, as shown in Fig. 2, the rubber tubing will project beyond the heads and the ends of the two pieces of tube will come together, as shown in Fig. 1. By this means the strands of the rope R are compressed tightly around and into the threads of the shank S, the coiled wire W is prevented from uncoiling and becoming displaced, the metal heads of the two couplings are prevented from becoming injured by moisture, the shank and operative parts of the coupling are also shielded from the elements, and the whole end of each rope is incased in a rubber tubing, whereby when the free ends of the rope are uncoupled and allowed to swing the metal thereof will not break the windows or the lamps of the car or injure the person of a passenger in case it strikes him, because such rubber tubing acts in the nature of a surrounding cushion to such metallic heads. The U-head A is interiorly screw-threaded throughout its cylindrical body $a$ and is open at its front end. The T-head B consists of a plain disk $b$, from the center of the forward face of which extends a projection P, having on one side a lug L, provided with a beveled front face, all as shown in Fig. 3.

Into the open end of the tubular head A is screwed a cylindrical plate C, having a slot $c$ in its body, one end of which slot stands concentric with the periphery of the plate and the other end of which slot is at one side thereof. To the under side of this plate is secured a block K, which is cut away, as at $k$, on a semicircle to conform with the inner end of the slot $c$ in the plate. Pivoted at $h$ on the under side of this plate C is a catch H, which is preferably also slightly cut away, as at $k$, and a curved spring G is secured at one end within the block K and presses at its free end upon the catch H in such a manner as to retain the latter normally in the position shown in Fig. 5.

The parts of my device being now properly assembled, it will be readily understood that the projection P of the T-head may be passed into the slot $c$, the beveled front face of the lug L bearing against the front edge of the catch H and turning the same on its pivot, so as to permit the entrance of the projection and lug. As soon as the lug has passed by the catch H the latter will snap into position and the parts of the coupling are connected. It will be understood that the block K and the catch H are of the same thickness, so that when the projection P is seated therein the lug L will ride on the rear face of the block and catch and one member of the coupling will be connected to the other by a swivel-coupling.

To remove or disconnect the members of the coupling, the projection P must be so turned that its straight edge will stand in the depression $k$ in the edge of the catch H, when by a slight lateral movement the lug L will be drawn off of the block K, and one member may be detached from the other by simply separating them longitudinally.

When the tubing T is in place upon the members of the coupling, it may be difficult to ascertain the relative positions thereof, and to facilitate the uncoupling of said members I preferably provide small lugs $t$, cast integral with and upon the exterior of said tubes at their meeting ends, as shown in Fig. 1, and these lugs can be brought into alignment with each other by the operator solely by the sense of touch, as in a dark night, and when so aligned the members of the coupling can be disconnected as just above described, it being understood of course that the tubing is relatively so placed upon the heads as to facilitate this uncoupling.

Especial stress is laid upon the use of the tubing, and it is to be understood that the rubber of which said tubing is composed must not only be soft and pliable, so as to have a good cushioning effect, but must also exert a certain inward pressure upon the exterior of the rope end, whereby it may serve the double purpose of acting as a buffer or cushion and of retaining the rope in close connection with and around the shanks of the head.

Having thus described my invention, what I claim is—

1. The herein-described rope-coupling, the same comprising a cylindrical head A, secured to one end of the rope and having a slotted front face, and a pivoted pawl upon said face passing over said slot, in combination with a T-head B, secured to the other end of the rope and provided with a projection having a lateral lug adapted to engage said slot and catch, substantially as set forth.

2. The combination, with the cylindrical head A, having the interior screw-thread $a$, the screw-threaded circular plate C, having the slot $c$, the block K, secured to the under face of said plate and having the cut-away portion $k$, surrounding the inner end of said slot, and the pivoted and spring-actuated catch H, having the cut-away portion $k$, completing a circle with a cut-away portion in the block and covering the outer end of the slot, said block and catch being of the same thickness of the T-head B, the projection P, extending forwardly from the center thereof, and the lug L at one side of said projection near its forward end, the front face of said lug being beveled, the whole operating substantially as and for the purpose described.

3. In a rope-coupling, the combination, with the two members A and B, having, respectively, the slotted front $c$ and the projection P, having lateral lug L, of the rubber tubing T, covering the ends of the rope and the heads of said members and extending beyond the front faces of the latter, and the lugs $t$, formed on the outer faces of the tubes, said lugs being in alignment when the parts of the members are in position for disconnection, substantially as described.

In testimony that I claim the foregoing as my own I have hereto affixed my signature in presence of two witnesses.

MELROSS McENTYRE KILLINGER.

Witnesses:
W. F. REAVIS,
C. W. CARR,